(12) United States Patent
Huang et al.

(10) Patent No.: US 9,671,545 B2
(45) Date of Patent: Jun. 6, 2017

(54) COVER, PORTABLE ELECTRONIC DEVICE USING THE SAME AND METHOD FOR MANUFACTURING THE SAME

(71) Applicant: Nokia Technologies Oy

(72) Inventors: Wuyang Huang, Beijing (CN); Xiaoyu Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/764,570

(22) PCT Filed: Jan. 30, 2013

(86) PCT No.: PCT/CN2013/071112
§ 371 (c)(1),
(2) Date: Jul. 29, 2015

(87) PCT Pub. No.: WO2014/117330
PCT Pub. Date: Aug. 7, 2014

(65) Prior Publication Data
US 2016/0004000 A1    Jan. 7, 2016

(51) Int. Cl.
*G02B 6/00*    (2006.01)
*F21V 8/00*    (2006.01)
(Continued)

(52) U.S. Cl.
CPC ......... *G02B 6/0036* (2013.01); *G02B 6/0028* (2013.01); *G02B 6/0061* (2013.01);
(Continued)

(58) Field of Classification Search
CPC .... G02B 6/002; G02B 6/0033; G02B 6/0036; G02B 6/0038; G02B 6/0093
See application file for complete search history.

(56) References Cited

U.S. PATENT DOCUMENTS 8,087,806 B2    1/2012  Chang
8,567,975 B2   10/2013  Yoo
(Continued)

FOREIGN PATENT DOCUMENTS

CN    101909410 A    12/2010
CN    102387228 A    3/2012

OTHER PUBLICATIONS

International Search Report and Written Opinion received in Patent Cooperation Treaty Application No. PCT/CN2013/071112, dated Nov. 7, 2013, 8 pages.

*Primary Examiner* — Julie Bannan
(74) *Attorney, Agent, or Firm* — Harrington & Smith

(57) ABSTRACT

A cover, a portable electronic device using the same and a method for manufacturing the same are provided. The cover comprises a transparent layer one surface of which is a textured surface. The cover also comprises a light guide formed in the transparent layer, one of interior surfaces of the light guide being the textured surface, wherein the light guide is for light guiding such that at least one beam of colored light is guided through the transparent layer and dispersed out of the transparent layer at a surface opposite to the textured surface as a result of being incident on the texture. With the cover according to embodiments of the present invention, a portable electronic device to which the cover is attached could be illuminated with different colored lights.

19 Claims, 7 Drawing Sheets

(51) Int. Cl.
 H04M 1/02 (2006.01)
 H05B 33/08 (2006.01)
 H04M 1/22 (2006.01)
(52) U.S. Cl.
 CPC ...... H04M 1/0283 (2013.01); H05B 33/0857 (2013.01); H04M 1/22 (2013.01)

(56) References Cited

U.S. PATENT DOCUMENTS

| | | | |
|---|---|---|---|
| 2003/0099113 A1* | 5/2003 | Gebauer | B60Q 1/0052 362/511 |
| 2003/0137824 A1* | 7/2003 | Shinohara | G02B 6/0036 362/611 |
| 2003/0160741 A1* | 8/2003 | Martinez | H04M 1/0283 345/49 |
| 2004/0022515 A1* | 2/2004 | Sugiura | G02B 6/0038 385/146 |
| 2004/0066659 A1* | 4/2004 | Mezei | G02B 6/001 362/555 |
| 2005/0259939 A1* | 11/2005 | Rinko | G02B 6/0018 385/146 |
| 2006/0164839 A1* | 7/2006 | Stefanov | F21S 48/215 362/327 |
| 2006/0209561 A1* | 9/2006 | Tenmyo | G02B 6/001 362/602 |
| 2008/0074383 A1* | 3/2008 | Dean | G02F 1/13476 345/156 |
| 2008/0080177 A1* | 4/2008 | Chang | G02F 1/133603 362/231 |
| 2008/0266901 A1* | 10/2008 | Chang | G02B 6/0021 362/618 |
| 2009/0021960 A1* | 1/2009 | Yeh | G02B 6/006 362/612 |
| 2009/0034264 A1* | 2/2009 | Zhu | G02B 6/0018 362/297 |
| 2009/0040748 A1* | 2/2009 | Kerr | G06F 1/181 362/154 |
| 2010/0078343 A1* | 4/2010 | Hoellwarth | B29C 45/14639 206/320 |

* cited by examiner

COVER, PORTABLE ELECTRONIC DEVICE USING THE SAME AND METHOD FOR MANUFACTURING THE SAME

RELATED APPLICATION

This application was originally filed as Patent Cooperation Treaty Application No. PCT/CN2013/071112 filed Jan. 30, 2013.

TECHNICAL FIELD

Embodiments of the present invention relate generally to a cover which can be attached to a portable electronic device, such as mobile handsets, and illuminate the portable electronic device with different colored lights.

BACKGROUND

The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

In recent years, many mobile handset manufacturers have been selling handsets with multicoloured covers so that their consumers have more opportunities to buy handsets with covers having their favorite colours. Generally, the cover is removable and its colour is monochromatic (such as pure black or white) such that the user can replace it with one having a different colour. Although the handsets with changeable covers are popular to consumers, specifically to young consumers, it may bring out some inconvenience. First, it is sometimes not easy for consumers to change the cover since a sufficient amount of force is needed to remove the old cover and mount a new one. Second, to get a cover with a different colour, the consumer would have to buy a new one and thus additional cost would be incurred. Third, the colour of the cover is generally fixed and cannot be changed except for replacement of the whole cover.

In view of the foregoing, it would be desirable to provide a cover that causes the portable electronic device (e.g., mobile handsets) to have different colours or appearances as expected by the consumers without changing the cover.

SUMMARY

To address or mitigate at least one of the above potential problems, certain embodiments of the present invention would provide for an efficient way of illuminating the portable electronic device such that the cover thereof appears to have various colours as desired by the users.

According to an embodiment of the present invention, there is provided a cover. The cover comprises a transparent layer one surface of which is a textured surface. The cover also comprises a light guide formed in the transparent layer, one of interior surfaces of the light guide being the textured surface, wherein the light guide is for light guiding such that at least one beam of coloured light is guided through the transparent layer and dispersed out of the transparent layer at a surface opposite to the textured surface as a result of being incident on the texture.

In one embodiment, the textured surface has a regular or irregular pattern.

In another embodiment, the at least one beam of coloured light is guided through the transparent layer using total internal reflection.

In a further embodiment, the textured surface has a plurality of curvatures at which the at least one beam of coloured light is reflected out of the transparent layer to be visible to a user.

In yet another embodiment, the transparent layer is flat extended and gradually curved towards its edge so as to enclose a back and periphery of a portable electronic device.

In one embodiment, the textured surface has texture elements of which gradual densities are in association with gradual distances from a source of the at least one beam of coloured light.

In another embodiment, the source of the at least one beam of coloured light is a light emitting diode.

In an additional embodiment, the light emitting diode is located at one side of the light guide and is shielded from being visible to a user.

In one embodiment, the light emitting diode is located away from the light guide and the at least one beam of coloured light emitted from the light emitting diode is guided through an optical channel towards the light guide.

In yet another embodiment, the cover further comprises an opaque layer which is located such that the textured surface is sandwiched between the transparent layer and the opaque layer.

According to another embodiment of the present invention, there is provided a portable electronic device, comprising the cover as set forth in the above multiple embodiments, further comprising a user interface where the user is able to change the coloured light using the user interface of the portable electronic device.

According to one embodiment of the present invention, there is provided a method. The method comprises providing a transparent layer one surface of which is a textured surface. The method also comprises providing a light guide formed in the transparent layer, one of interior surfaces of the light guide being the textured surface, wherein the light guide is for light guiding such that at least one beam of coloured light is guided through the transparent layer and dispersed out of the transparent layer at a surface opposite to the textured surface as a result of being incident on the texture.

For simplicity, the embodiments as discussed above in connection with the cover may also be equally applied to the method as its multiple applicable embodiments.

According to the embodiments of the present invention as presented above, by virtue of an integrated light guide, a cover, which can be used as e.g., a back cover of a portable electronic device, could be illuminated with different coloured lights, which achieves effect of seemingly having multiple covers of different colours. Further, due to arrangement of the textured surface, the light can be evenly dispersed out of the transparent layer and illuminating the whole portable electronic device, thereby giving the aesthetic appearance of the portable electronic device a big boost and enhancing a user's viewing experience. Additionally, due to the illumination using various coloured lights, it is unnecessary to remove the old cover and mount a new one so as to change the colour of the cover. In this manner, the additional cost for payment of a new cover is also saved.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Hereinafter, detailed descriptions of the embodiments of the present invention will be made in reference to accompanying drawings.

Figure 1:
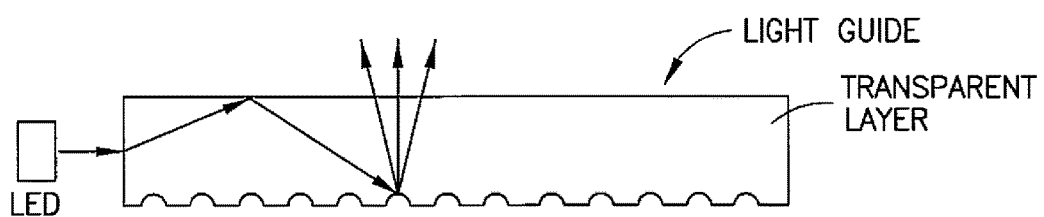
FIG. 1 schematically illustrates a sectional view of a cover and a light source (e.g., a light-emitting diode, LED) disposed on one side of the cover according to an embodiment of the present invention.

FIG. 1 schematically illustrates a sectional view of a cover and a light source (e.g., a light-emitting diode, LED) disposed on one side of the cover according to an embodiment of the present invention. As illustrated in FIG. 1, the cover according to embodiments of the present invention comprises a transparent layer and one of its surfaces is a textured surface, which is schematically illustrated as being formed by a plurality of concave grooves disposed on the bottom surface of the transparent layer. Although the grooves are spaced apart from each other with a fixed interval, it is preferable to dispose the grooves in an irregular interval. In other words, the textured surface may have a regular or irregular pattern. For instance, the grooves close to the light source would be located with each other at a long interval while the grooves far away from the light source would be located with each other at a short interval. That is, the longer the distance between the LED and the texture, the higher the density of the texture. In this manner, when the color light emitted from the LED is deflected out of the transparent layer due to incidence on the texture, the brightness distribution of the light emission surface, i.e., the upper surface of the transparent layer, is made uniform.

From the above, it can be seen that the textured surface according to the embodiments of the present invention may have a plurality of curvatures at which the at least one beam of coloured light is reflected out of the transparent layer to be visible to a user. Further, the textured surface according to embodiments of the present invention may have texture elements of which gradual densities are in association with gradual distances from a source of the at least one beam of coloured light (e.g., an LED) such that the at least one beam of coloured light is evenly dispersed out of the transparent layer due to incidence on the texture. Further, the sizes of the texture elements can be flexibly set such that uniform luminance could be achieved.

The transparent layer according to the embodiments of the present invention may be fully transparent or semi-transparent taking into account the illumination effect as desired by the consumers. Although the transparent layer as illustrated is flat extended, it may be slightly curved as a whole or gradually curved towards its edge so as to enclose a back and periphery of a portable electronic device.

The portable electronic device to which the cover according to the embodiments of the present invention is secured may include a mobile phone, a user equipment, a smart terminal, a digital broadcast receiver, a personal digital assistant, a laptop computer, a portable multimedia players (PMP), and a navigator, as non-limiting examples.

Integrated or formed within the transparent layer is a light guide which is able to guide at least one beam of coloured light through the transparent layer and dispersed out of the transparent layer at a surface opposite to the textured surface as a result of being incident on the texture, wherein the at least one beam of coloured light is guided through the transparent layer using an existing total internal reflection technique. By means of the total internal refection technique, the coloured light can be transmitted far away and even pass through corners of the cover.

In an embodiment, the at least one beam of coloured light as discussed above is provided by at least one LED. The LED light source may emit a single color light of red, green or blue. To enhance the light intensity, the LED is located at one side of the light guide and is shielded from being visible to a user for an aesthetic purpose. In another embodiment, the LED is located away from the light guide and the at least one beam of coloured light emitted from the LED is guided through an optical channel towards the light guide. The optical channel may be established using a plurality of prisms with appropriate parameters, such as the focal length, the radius of curvature and the like.

Figure 2:
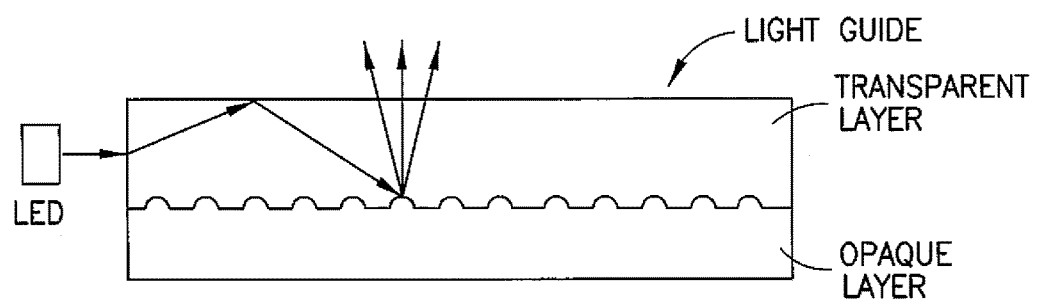
FIG. 2 schematically illustrates a sectional view of a cover and a light source disposed on one side of the cover according to another embodiment of the present invention.

FIG. 2 schematically illustrates a sectional view of a cover and a light source disposed on one side of the cover according to another embodiment of the present invention. The cover as illustrated in FIG. 2 is substantively identical to the cover as illustrated in FIG. 1 except that the cover in FIG. 2 further comprises an opaque layer which is located such that the textured surface is sandwiched between the transparent layer and the opaque layer. The opaque layer can be advantageously used so that no internal structure of the portable electronic device is visible to the user and a seemingly 3D depth effect can be engendered, thereby achieving a better visual experience.

The cover as illustrated in FIGS. 1 and 2 can be manufactured by e.g., a shooting or injection molding technique. The cover illustrated in FIG. 1 can be manufactured by one shot. In contrast, the cover illustrated in FIG. 2 can be manufactured by two shots, wherein the first shot is outside and transparent, resulting in the transparent layer, and the second shot is inside and opaque, resulting in the opaque layer. The material used to manufacture the transparent and opaque layers may include polycarbonate, PMMA, TPU etc., as non-limiting examples. It should be noted that the texture as sandwiched between the transparent layer and the opaque layer can be shot either on the bottom surface of the transparent layer or on the upper surface of the opaque layer during the manufacture processing.

Figure 3:
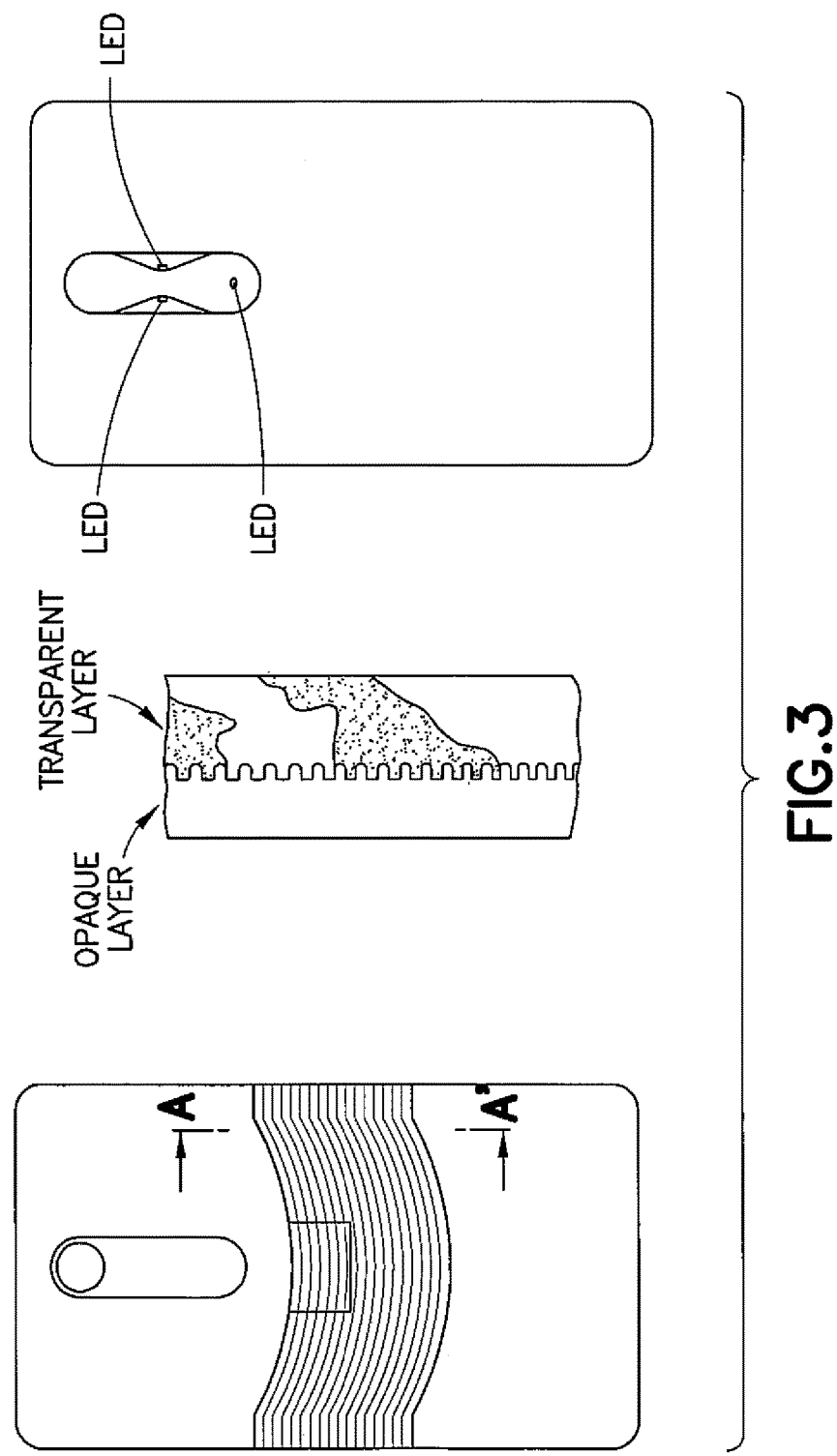
FIG. 3 is a schematic view that illustrates the sectional view of the cover as illustrated in FIG. 2 in an A-A' direction and a plurality of LEDs according to an embodiment of the present invention.

FIG. 3 is a schematic view that illustrates the sectional view of the cover as illustrated in FIG. 2 in an A-A' direction and a plurality of LEDs according to an embodiment of the present invention. Illustrated at the left side of FIG. 3 is a back part of a portable electronic device as selectively used by NOKIA smart phone Lumia series, of which the middle portion is illuminated using the cover as illustrated in FIG. 2. Illustrated at the middle of FIG. 3 is a part of the cover as illustrated in FIG. 2 in a vertical direction. Illustrated at the right side of FIG. 3 is a perspective view of the back cover at issue in which three LEDs used as the light source are indicated. As seen from the drawing and also as mentioned before, the distribution of the texture elements (embodied and illustrated as dots) is loose in the vicinity of the LEDs and becomes increasingly intensive when the texture elements are progressively distant from the LEDs.

It should be noted that the LED placement as depicted in FIG. 3 is only illustrative of one possible arrangement that can be applied according to embodiments of the present invention. A person skilled in the art is able to understand, based on the present disclosure, that the LEDs can be placed at any suitable positions within or beneath the cover as long as they can provide colorful illumination as expected by the user. Further, the number of the LEDs as illustrated in FIGS. 1-3 is only for an illustrative purpose. A person skilled in the art can understand that any suitable number of LEDs can be used to provide multicolored illumination and the use of each LED is controllable by software. For example, a user is able to select an expected coloured light by using a user interface installed on the portable electronic device to select or enable, from multiple LEDs, an LED which can emit the expected coloured light.

Figure 4:
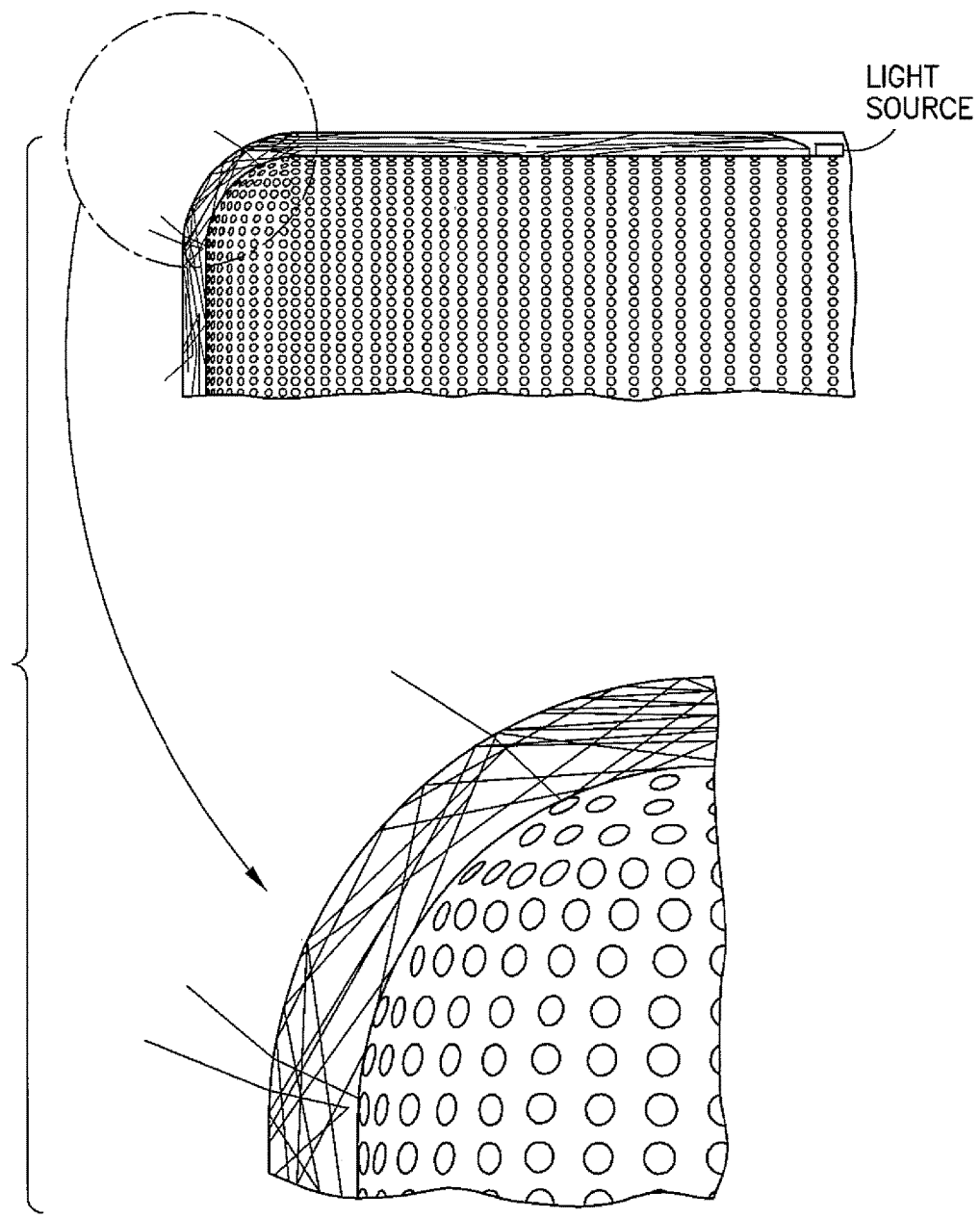
FIG. 4 schematically illustrates light reflection and deflection at the corner of the cover according to embodiments of the present invention.

FIG. 4 schematically illustrates light reflection and deflection at the corner of the cover according to embodiments of the present invention. As illustrated at the upper part of FIG. 4, a light source, such as an LED, is disposed at the side surface of the cover and it emits a colorful beam of light. The colorful beam of light travels along the light guide by total internal reflection and penetrate the transparent layer due to incidence on the texture. Illustrated at the bottom part of FIG. 4 is an enlarged view of the corner as enclosed by a circle. As seen from this enlarged view, at the corner of the cover, the beam of light is also subject to the total internal reflection and is emitted out of the transparent layer due to an occurrence of the deflection at the texture. In this manner, the embodiments of the present invention ensure that even the corners of the cover could be illuminated and thereby the colour change of the cover may be more perceptible to the human eye.

Figure 5:
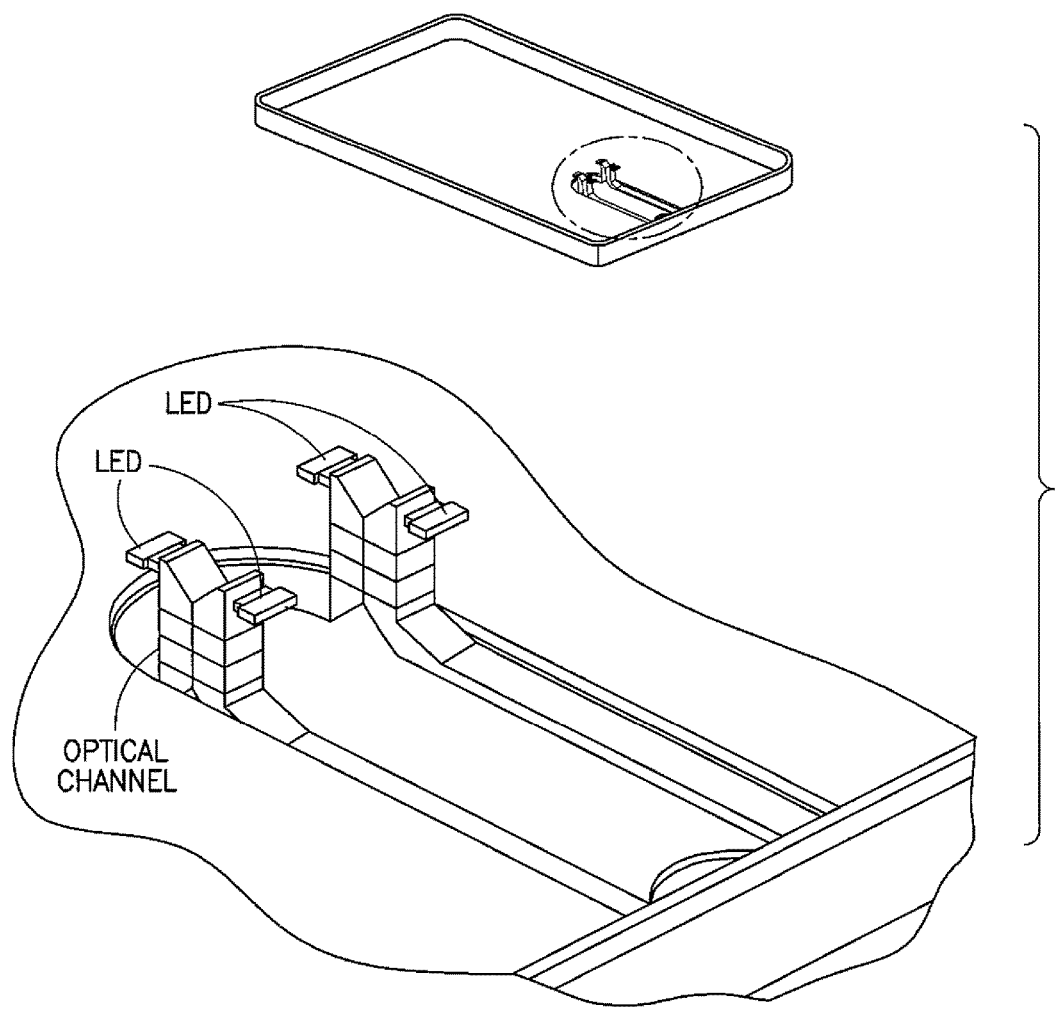
FIG. 5 schematically illustrates a light source arrangement according to an embodiment of the present invention.

FIG. 5 schematically illustrates a light source arrangement according to an embodiment of the present invention. As illustrated in FIG. 5, the upper part thereof is a perspective view of the entire outline of a portable electronic device whose bottom part is surrounded by the cover according to the embodiments of the present invention. Inside the cover are four LEDs which are fixed at the entrance of the optical channel and capable of providing light emission of four different colours. The coloured light would be subject to several refractions and ultimately guided by the light guide according to the embodiments of the present invention to travel through the transparent layer and emit out of the transparent layer as a result of being incident on the texture, so as to illuminate the portable electronic device.

Figure 6:
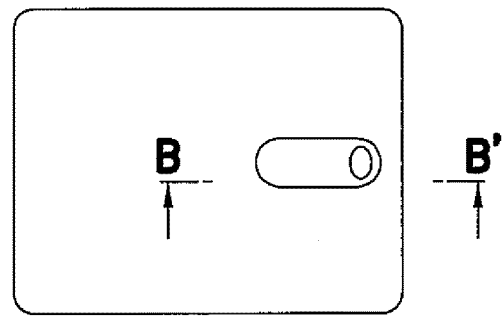
FIG. 6 is a sectional view of a cover and light source arrangements taken from in a B-B' direction according to embodiments of the present invention.
Figure 6:
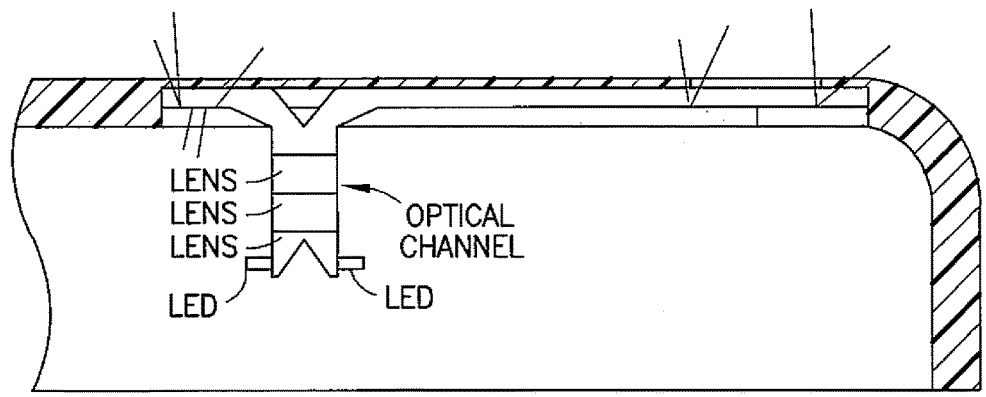

FIG. 6 is a sectional view of a cover and light source arrangements taken from in a B-B' direction according to embodiments of the present invention. It can be seen that the view as illustrated in FIG. 6 is another graphical representation of the view as illustrated in FIG. 5. In other words, the view in FIG. 6 is formed by turning the cover in FIG. 5 upside down. As seen from FIG. 6, the LEDs emit the color light of red or green or blue and the color light advances along the predetermined optical channel from bottom to top, which may be established by several optical lenses dependent on the length of the optical channel. As discussed before, once reaching the light guide, the beam of light will experience the total internal reflection and may be dispersed out of the cover due to incidence on the texture. It is clear to a person skilled in the art that the LEDs used as light sources according to embodiments of the present invention can be flexibly set as appropriate.

Figure 7A:
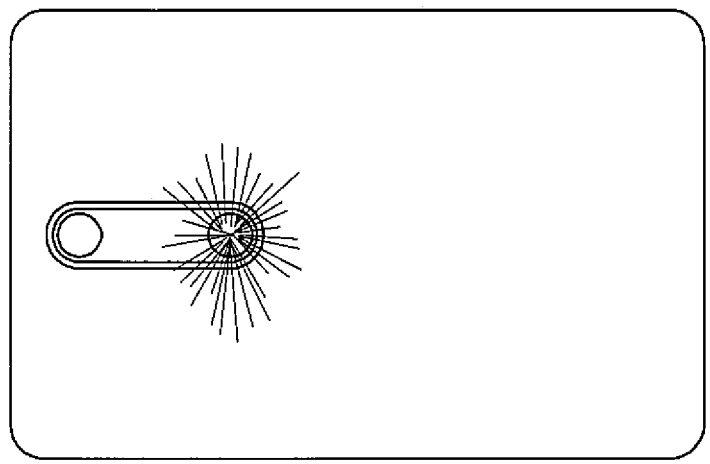
FIGS. 7a and 7b illustrate a cover including a light guide formed in a ring-shaped structure and lights propagated through the light guide or dispersed out of the light guide according to an embodiment of the present invention.
Figure 7B:
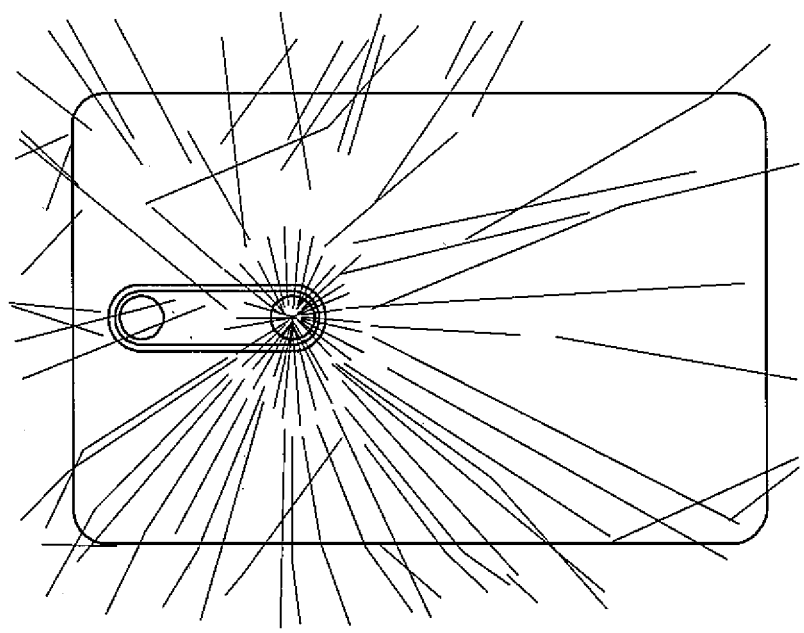

FIGS. 7a and 7b illustrate a cover including a light guide formed in a ring-shaped structure and lights propagated through the light guide or dispersed out of the light guide according to an embodiment of the present invention, using the back cover of NOKIA smart phone Lumia series as an non-limiting example. As seen from FIG. 7a, in the ring-shaped light guide, the emitted color light may penetrate the transparent layer and illuminate the ring area. Further, the emitted color light keeps advancing and illuminates the further area on the cover, as illustrated in FIG. 7b. The illumination effects as respectively depicted by FIGS. 7a and 7b can be preconfigured by the user according to his or her preferences via a user interface.

Figure 8:
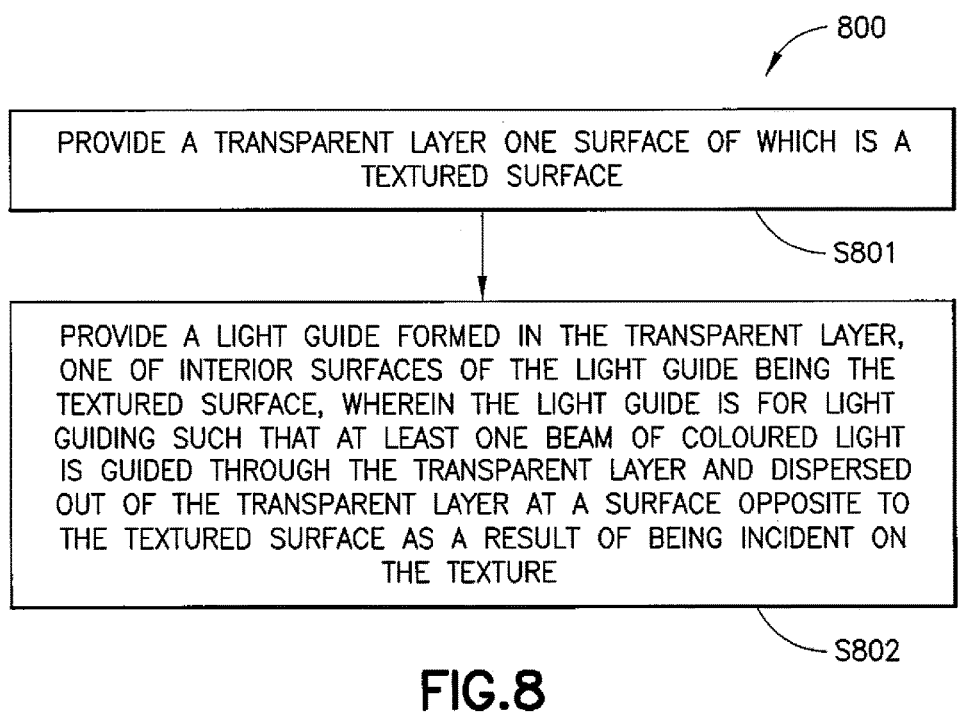
FIG. 8 is a flow chart schematically illustrating a method according to embodiments of the present invention.

FIG. 8 is a flow chart schematically illustrating a method 800 according to embodiments of the present invention. At step S801, the method 800 provides a transparent layer one surface of which is a textured surface. At step S802, the method 800 provides a light guide formed in the transparent layer, one of interior surfaces of the light guide being the textured surface, wherein the light guide is for light guiding such that at least one beam of coloured light is guided through the transparent layer and dispersed out of the transparent layer at a surface opposite to the textured surface as a result of being incident on the texture.

Although not shown, in an embodiment, the method 800 further comprises forming a regular or irregular pattern on the textured surface. In another embodiment, the method 800 further comprises using total internal reflection to guide the at least one beam of coloured light through the transparent layer.

It should be noted that the features of the transparent layer and the light guide as discussed before in connection with FIGS. 1 and 2 may also be applicable to the method 800. For simplicity's purpose, the duplicated description is omitted herein.

The foregoing has discussed the method 800 and its multiple variants and extensions according to the embodiments of the present invention. With the method 800, the cover according to the embodiments of the present invention can be manufactured and may be applied or secured to the back part of the portable electronic device.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the specification do not imply any specific order in which the features/steps must be worked. Rather, the steps/features may be performed in any suitable order.

What is claimed is:

1. A cover, comprising:
   a transparent layer, one surface of the transparent layer being a textured surface;
   a light guide formed in the transparent layer, one of interior surfaces of the light guide being the textured surface, the light guide being operable to guide at least one beam of coloured light is guided through the transparent layer and disperse the beam of coloured light out of the transparent layer at a surface opposite to the textured surface;
   an optical channel coupled to the light guide, the optical channel comprising a plurality of optical lenses, the plurality of optical lenses being operable to guide the at least one beam of coloured light through the optical channel; and
   a light source coupled to the optical channel and being configured to provide the at least one beam of coloured light;
   wherein the transparent layer is flat extended and gradually curved proximate an edge of the transparent layer such that the textured surface is on a portion of the gradual curve.

2. The cover according to claim 1, wherein the textured surface has a regular or irregular pattern.

3. The cover according to claim 1, wherein the cover is operable to guide the at least one beam of coloured light through the transparent layer by way of total internal reflection.

4. The cover according to claim 1, wherein the textured surface comprises a plurality of curvatures.

5. The cover according to claim 1, wherein the textured surface comprises texture elements of varying densities, the texture elements being arranged to provide a gradual density of texture elements across the textured surface.

6. The cover according to claim 5, wherein the light source configured to provide the at least one beam of coloured light is a light emitting diode.

7. The cover according to claim 6, wherein the light emitting diode is located at one side of the light guide and is shielded from being visible to a user.

8. The cover according to claim 6, wherein the light emitting diode is located away from the light guide, and the optical channel is operable to guide the at least one beam of coloured light through the optical channel towards the light guide.

9. The cover according to claim 1, further comprising:
   an opaque layer which is beneath the transparent layer such that the textured surface is sandwiched between the transparent layer and the opaque layer.

10. A portable electronic device comprising the cover of claim 1, further comprising a user interface where the user is able to change the coloured light using the user interface of the portable electronic device.

11. A method, comprising:
    providing a transparent layer, one surface of the transparent layer being a textured surface;
    providing a light guide formed in the transparent layer, one of interior surfaces of the light guide being the textured surface, the light guide operable to guide at least one beam of coloured light through the transparent layer and disperse the beam of coloured light out of the transparent layer at a surface opposite to the textured surface;
    providing an optical channel coupled to the light guide, the optical channel comprising a plurality of optical lenses, the plurality of optical lenses being operable to guide the at least one beam of coloured light through the optical channel; and
    providing a light source coupled to the optical channel and being configured to provide the at least one beam of coloured light;
    wherein the transparent layer is flat extended and gradually curved proximate an edge of the transparent layer such that the textured surface is on a portion of the gradual curve.

12. The method according to claim 11, further comprising:
    forming at least one of a regular or irregular pattern on the textured surface.

13. The method according to claim 11, further comprising:
    guiding the at least one beam of coloured light through the transparent layer by way of internal reflection.

14. The method according to claim 11, wherein the textured surface has a plurality of curvatures.

15. The method according to claim 11, wherein the textured surface comprises texture elements of varying densities, the texture elements being arranged to provide a gradual density of texture elements across the textured surface.

16. The method according to claim 15, wherein the light source configured to provide the at least one beam of coloured light is the light emitting diode.

17. The method according to claim 16, wherein the light emitting diode is located away from the light guide, and the optical channel is operable to guide the at least one beam of coloured light through the optical channel towards the light guide.

18. The method according to claim 11, further comprising:
    providing an opaque layer which is located such that the textured surface is sandwiched between the transparent layer and the opaque layer.

19. A cover, comprising:
- a transparent layer;
- a textured surface comprising a plurality of discrete textured elements on an inner surface of the transparent layer;
- a light guide formed in the transparent layer, one of interior surfaces of the light guide comprising the textured surface, the light guide being operable to guide at least one beam of coloured light through the transparent layer and disperse the beam of coloured light out of the transparent layer at a surface opposite to the textured surface;
- an optical channel coupled to the light guide, the optical channel comprising a plurality of optical lenses, the plurality of optical lenses being operable to guide the at least one beam of coloured light through the optical channel; and
- a light emitting diode coupled to the optical channel and being configured to provide the at least one beam of coloured light;
- wherein the transparent layer is flat extended and gradually curved proximate an edge of the transparent layer such that the textured surface is on a portion of the gradual curve.

* * * * *

UNITED STATES PATENT AND TRADEMARK OFFICE
CERTIFICATE OF CORRECTION

| | | |
|---|---|---|
| PATENT NO. | : 9,671,545 B2 | Page 1 of 1 |
| APPLICATION NO. | : 14/764570 | |
| DATED | : June 6, 2017 | |
| INVENTOR(S) | : Wuyang Huang and Xiaoyu Liu | |

It is certified that error appears in the above-identified patent and that said Letters Patent is hereby corrected as shown below:

In the Claims

In Claim 1:
Column 7, Line 37, "is guided" should be deleted.

In Claim 3:
Column 7, Line 55, "cover" should be deleted and --light guide-- should be inserted.

Signed and Sealed this
First Day of August, 2017

Joseph Matal
*Performing the Functions and Duties of the*
*Under Secretary of Commerce for Intellectual Property and*
*Director of the United States Patent and Trademark Office*